United States Patent [19]

Woodruff et al.

[11] Patent Number: 5,039,246

[45] Date of Patent: Aug. 13, 1991

[54] METHOD AND MEANS FOR SECURING SCREEN TO A FRAME

[75] Inventors: Alan H. Woodruff, Altoona; John S. Holloway, Carlisle, both of Iowa

[73] Assignee: Emco Specialties, Inc., Des Moines, Iowa

[21] Appl. No.: 597,383

[22] Filed: Oct. 15, 1990

[51] Int. Cl.⁵ .................................................. F16D 1/00
[52] U.S. Cl. ........................................ 403/24; 403/319; 160/392; 160/395
[58] Field of Search ..................... 160/395, 392, 371; 403/319, 24

[56] References Cited

U.S. PATENT DOCUMENTS 3,987,835 10/1976 Bloomfield ........................... 160/392
4,084,360 4/1978 Reckson ............................... 52/586 X
4,267,876 5/1981 Bloomfield ........................... 160/392
4,472,862 9/1984 Bloomfield ........................ 160/392 X Primary Examiner—Andrew V. Kundrat
Attorney, Agent, or Firm—Zarley, McKee, Thomte, Voorhees & Sease

[57] ABSTRACT

A spline channel in a frame member is used in combination with a spline for securing a screen to the frame member. The spline channel includes a bottom wall having two end walls extending upwardly therefrom and terminating in inwardly extending lips. One of the lips extends further inwardly than the other of the two lips. The spline includes opposite side edges, one of which is forced into the recess beneath the longest lip so as to force the screen into the recess between the spline and the end wall of the channel. The opposite edge of the spline is then pressed downwardly until it snaps into the channel and holds the screen in place.

8 Claims, 1 Drawing Sheet

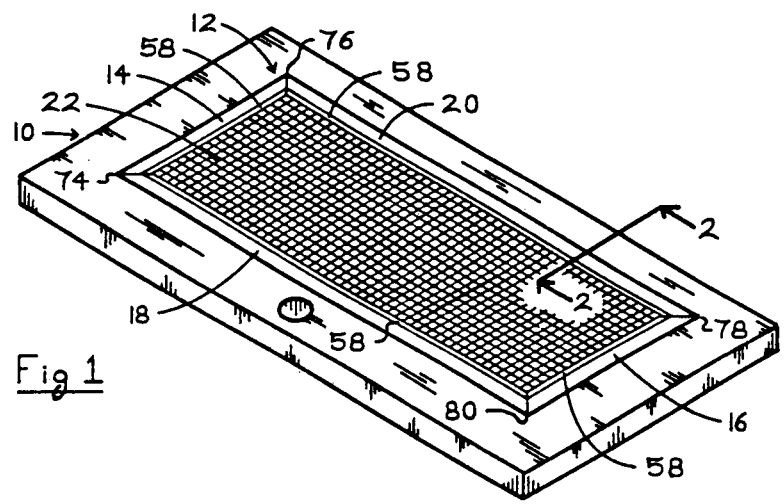
Fig 1
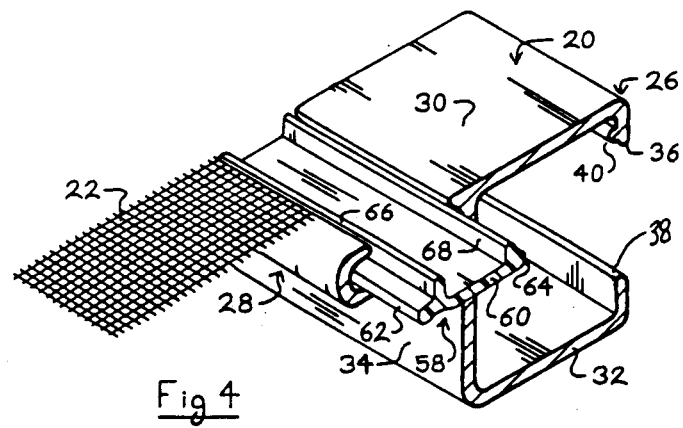
Fig 4
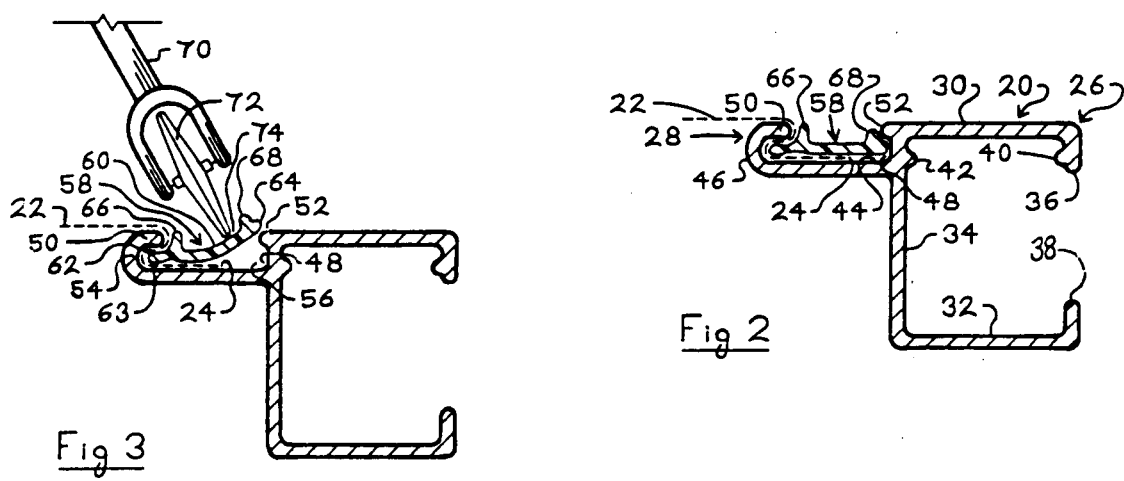
Fig 3
Fig 2

METHOD AND MEANS FOR SECURING SCREEN TO A FRAME

BACKGROUND OF THE INVENTION

This invention relates to a method and means for securing a screen to a frame.

Screens are often attached to rectangular frames for use in windows and doors. Often the frames are made of aluminum extrusions having an elongated groove or channel therein. The edges of the screen are placed within the channel and a square or round elongated bead material is pressed into the groove over the screen to secure the screen to the frame.

There are several disadvantages to the use of the square or round beads for attaching to the frame. One disadvantage is that the bead is usually less than an eighth of an inch in diameter, and therefore it is difficult to cut the screen exactly to size. Often times the edge of the screen will be slightly short of the bead, thereby leaving a hole adjacent the edge of the frame, or the screen will be too long and extend through the channel and protrude from the outside edge of the channel after the bead is inserted.

Another disadvantage of the use of the square or round beads for securing the screen to the channel is that the resulting attachment is not very strong. When the screen is in use, a small force against the screen can cause the screen to pull free from the bead and the channel, thereby creating a hole adjacent the edge of the screen.

Therefore, a primary object of the present invention is the provision of an improved method and means for securing a screen to a frame.

A further object of the present invention is the provision of an improved method and means for securing a screen to a frame, whereby the screen will withstand a stronger force than prior devices without tearing away from the attachment to the frame.

A further object of the present invention is the provision of a method and means for securing a screen to the frame, whereby the spline attaching the screen to the frame can be easily installed.

A further object of the present invention is the provision of an improved method and means for securing a screen to a frame which will simplify and make easier the trimming of the screen to fit the frame.

A further object of the present invention is the provision of a method and means for securing a screen to a frame which is economical to manufacture, durable in use, and efficient in operation.

SUMMARY OF THE INVENTION

The present invention utilizes a frame member having an elongated spline channel extending there along. A spline is shaped to fit within the spline channel to attach the edge of the screen within the spline channel.

The spline channel includes a bottom surface, first and second end surfaces at the end of the bottom surface, and first and second lips extending inwardly from the upper edges of the end surfaces. One of the lips, the one located on the inner edge of the frame, is substantially longer than the other of the lips.

The spline used for the present invention includes in cross section a horizontal web having opposite web edges. Extending upwardly from the upper surface of the web are a pair of upstanding ribs. Each of the ribs is spaced inwardly a distance from the edges of the web, with one of the ribs being spaced inwardly further than the other.

The screen is attached within the channel by placing the edge of the screen inside the channel extending along the bottom surface of the channel. The channel has substantial width, and therefore the edge of the screen need not be cut to the exact size of the frame, but only need be cut to fit within the margins of the bottom surface of the channel. The edge of the screen is placed against the bottom of the channel, and the remainder of the screen extends upwardly out of the channel and across the longer of the two lips of the channel toward the interior of the frame.

One edge of the spline is pressed against the screen and is forced into the recess formed by the lip at the inner edge of the frame. This causes the screen to also be pressed into the recess so that the screen extends in a serpentine manner around the lip of the channel, into the recess beneath the lip of the channel, and back along the bottom surface of the channel.

A pressing wheel is then applied to the opposite edge of the spline so as to cause it to deform slightly and cause its opposite edge to snap beneath the other of the two lips so that it fits within the recess below the other of the two lips. This secures the spline within the channel so that it cannot be removed, and the screen is tightly held by virtue of its being folded around the inner edge of the spline.

Securing the screen to the frame in the above-described manner results in a much stronger attachment of the screen to the frame so that the screen requires a much greater pulling force than with prior devices before the screen will tear apart from the attachment.

BRIEF DESCRIPTION OF THE DRAWINGS

FIG. 1 is a perspective view of a screen door utilizing the method and means of the present invention to attach the screen to the frame.

FIG. 2 is a sectional view taken along line 2—2 of FIG. 1.

FIG. 3 is a view similar to FIG. 2, and showing the method by which the spline is pressed into the channel of the frame member.

FIG. 4 is a detailed perspective view showing the manner in which the spline, the screen, and the channel are fitted together.

DESCRIPTION OF THE PREFERRED EMBODIMENT

Referring to the drawings, the numeral 10 refers to a typical screen door having fitted therein a rectangular screen frame 12. Screen frame 12 includes a top frame member 14, a bottom frame member 16, and two opposite side frame members 18, 20. A screen material 22 is secured at its opposite edges to the frame members 14, 16, 18, and 20, and spans the opening within the interior of the rectangular screen frame 12. Screen material 22 includes an outer margin or edge 24 which is approximately straight, but which can have slight deviations from a straight line along its outer edges.

Frames 14, 16, 18, and 20 are all of the same structure in cross section, and therefore the cross sectional structure of frame member 20 shown in FIGS. 2 and 3 is the same for frame members 14, 16, and 18. Frame member 20 includes in cross section a C-shaped portion 26 and a J-shaped portion 28 extending horizontally therefrom. C-shaped portion 26 includes a top horizontal portion 30, a bottom horizontal portion 32, a vertical web 34, an upper C-lip 36, and a lower C-lip 38. A pair of spaced apart nodes 40, 42 are provided opposite of one another on the interior surfaces of web 34 and C-lip 36.

The J-shaped portion includes a channel having a horizontal bottom wall 44 with first and second end walls 46, 48 at its opposite ends. A first longer lip 50 extends inwardly from end wall 46, and a second shorter lip 52 extends inwardly from the upper end of end wall 48. This creates a first recess 54 below lip 50 and a second recess 56 below lip 52.

A spline member 58 includes a horizontal web 60 having an inner spline edge 62 and an outer spline edge 64. Extending upwardly from the upper surface of web 60 are a pair of parallel spaced-apart, upstanding ribs 66, 68. Rib 66 is spaced inwardly from the edge 62 a distance which is greater than the distance that rib 68 is spaced inwardly from edge 64 of spline member 58.

The method of inserting the spline into the channel for securing the screen to the frame member 20 is shown in FIG. 3. The edge 24 of screen 22 is placed within the channel so that it extends along the bottom wall of the channel. The screen is then passed upwardly over lip 50 and inwardly to the center of the screen frame 12.

Spline 50 is then positioned in the manner shown in FIG. 2 so that the edge 62 is forced against the screen 22 and into the recess 54 beneath lip 50. This causes the screen to be deformed into a serpentine shape passing around the end of lip 50 and reversing itself into the recess 54 where it passes around the edge 62 of spline 58 and again reverses itself ending in edge 24 on the bottom wall 44 of the channel. It should be noted that the edge 62 of the spline has a slight enlarged portion or node 63 which ensures a tight fit within recess 54 and which also adds to the tightness with which the screen is attached within the channel.

The final step of inserting the spline member 58 into the channel is accomplished as shown in FIG. 3. A pressing tool 70 is used for this purpose and includes a rotating wheel 72 having an outer circumferential edge 74 which is fitted against the inner edge of rib 68 and is forced downwardly.

The spline 58 is comprised of conventional PVC material which is substantially rigid, but which is capable of being deformed in response to pressure in the manner shown in FIG. 3. The pressure of the wheel 72 causes the spline 58 to deform and causes the outer spline edge 64 to slip past the lip 52 of the channel and to snap into place within the recess 48 of the channel in the manner shown in FIG. 2. The PVC material of the spline 58 has sufficient resiliency to permit the spline to resume its original shape within the channel and to be held within the channel by virtue of the edges 62, 64 of the spline resting within the recesses 54, 56 of the channel.

The force required to pull the screen 22 out of attachment within the channel as described above is substantially greater than the force required with prior methods for securing screens to channels. Furthermore, utilization of the above method does not require trimming of the screen after the screen has been fitted and attached to the frame as shown in FIG. 1. The width of the bottom wall 44 of the channel permits slight deviations in the dimensions of the screen without requiring any trimming after attachment.

The corners of the frame members meet in miter joints designated by the numerals 74, 76, 78, and 80. The ends of the splines 58 can be mitered to conform with these miter joints.

Thus it can be seen that the device accomplishes at least all of its stated objectives.

We claim:

1. A device for securing screen material to a frame, said screen material having at least one approximately straight edge, said device comprising:

a frame member having an elongated spline channel, said spline channel comprising in cross section a bottom surface having opposite side edges, first and second end surfaces extending upwardly from said opposite side edges of said bottom surface, and first and second lips extending from said first and second end surfaces respectively inwardly toward one another where they terminate in lip ends which are spaced apart a first predetermined distance from one another and which are spaced above said bottom surface;

said first and second lips, said first and second end surfaces, and said bottom surface forming first and second recesses located adjacent said opposite side edges of said bottom surface;

said first lip having a length substantially greater than said second lip;

said first and second lips having an outer surface defining an exterior plane spaced apart from said bottom surface of said channel;

an elongated spline having in cross section a central web having opposite web edges spaced apart a second distance greater than said first predetermined distance between said lips of said channel, and less than the distance between said first and second end surfaces of said spline channel;

said spline having first and second spaced apart upstanding ribs extending upwardly from said web and spaced inwardly from said opposite web edges of said spline;

said spline being matingly received in said spline channel with said web edges fitted within said recesses of said channel and with said first and second upstanding ribs positioned between and adjacent said first and second lips respectively of said channel;

said ribs of said spline extending toward, but not beyond the exterior plane defined by the lips of the channel;

said straight edge of said screen being positioned between said spline and said channel and extending along the length of said bottom surface of said channel, said screen extending from said straight edge around one of said web edges of said spline and out of said channel between said first rib of said spline and said first lip of said channel; and said central web of said spline pressing said screen into frictional engagement with the bottom surface of the channel substantially across the width of the channel.

2. A device according to claim wherein said spline is made of a material which is deformable from its original cross sectional shape so as to permit its deformation for inserting said spline into said channel, said material being sufficiently elastic to permit it to return to its original cross sectional shape after said spline has been inserted into said channel.

3. A device according to claim 2 wherein said one of said web edges includes a node thereon, said node having a thickness greater than the thickness of said web.

4. A method for securing screen material to a frame member, said screen material having at least one straight edge, said frame member having an elongated spline channel, said spline channel comprising in cross section a bottom surface having opposite side edges, first and second end surfaces extending upwardly from said opposite side edges of said bottom surface, and first and second lips extending from said first and second end surfaces respectively inwardly toward one another where they terminate in lip ends which are spaced apart a first predetermined distance from one another and which are spaced above said bottom surface, said first and second lips, said first and second end surfaces, and said bottom surface forming first and second recesses located adjacent said opposite side edges of said bottom surface, said first lip having a length substantially greater than said second lip, an elongated spline having in cross section a central web having opposite web edges spaced apart a second distance greater than said first predetermined distance between said lips of said channel, and less than the distance between said first and second end surfaces of said spline channel, said spline having first and second spaced apart upstanding ribs extending upwardly from said web and spaced inwardly from said opposite web edges of said spline, said method comprising:

placing said straight edge of said screen in said channel adjacent said bottom surface thereof with the remainder of said screen extending upwardly out of said channel and over said first lip;

using one of said web edges of said spline to deform said screen and force said screen into said first recess with said screen being between said one web edge and said end surface of said channel and with said one web edge being within said first recess;

pressing the other of said web edges of said spline downwardly toward said bottom surface of said channel, said spline having a sufficient flexibility and resilience to deform in response to said pressing so that said other web edge will cam around said second lip and snap into said second recess of said channel; and using a press wheel to press the other of said edges of said spline downwardly toward said bottom wall, said press wheel having a circumferential edge which is rolled along the upwardly presented surface of said spline during said pressing operation.

5. A method according to claim 4 wherein said press wheel is placed in engagement with said spline between said spaced apart ribs of said spline.

6. A device for securing screen material to a frame, said screen material having at least one approximately straight edge, said device comprising:

a frame member having an elongated spline channel, said spline channel comprising in cross section a bottom surface having opposite side edges, first and second end surfaces extending upwardly from said opposite side edges of said bottom surface, and first and second lips extending from said first and second end surfaces respectively inwardly toward one another where they terminate in lip ends which are spaced apart a first predetermined distance from one another and which are spaced above said bottom surface;

said first and second lips, said first and second end surfaces, and said bottom surface forming first and second recesses located adjacent said opposite side edges of said bottom surface;

said first lip having a length substantially greater than said second lip;

an elongated spline having in cross section a central web having opposite web edges spaced apart a second distance greater than said first predetermined distance between said lips of said channel, and less than the distance between said first and second end surfaces of said spline channel;

said spline having first and second spaced apart upstanding ribs extending upwardly from said web and spaced inwardly from said opposite web edges of said spline;

said spline being matingly received in said spline channel with said web edges frictionally fitted in a tight mating engagement within said recesses of said channel and with said first and second upstanding ribs positioned between and adjacent said first and second lips respectively of said channel; and said straight edge of said screen being positioned between said spline and said channel and extending along the length of said bottom surface of said channel, said screen extending from said straight edge around one of said web edges of said spline and out of said channel between said first rib of said spline and said first lip of said channel.

7. A device according to claim 6 wherein said spline is made of a material which is deformable from its original cross sectional shape so as to permit its deformation for inserting said spline into said channel, said material being sufficiently elastic to permit it to return to its original cross sectional shape after said spline has been inserted into said channel.

8. A device according to claim 7 wherein said one of said web edges includes a node thereon, said node having a thickness greater than the thickness of said web.

* * * * *